(12) United States Patent
Toebes

(10) Patent No.: US 9,277,040 B2
(45) Date of Patent: Mar. 1, 2016

(54) PRESENCE BASED CONNECTING NUMBER SEARCH

(75) Inventor: John A. Toebes, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 1678 days.

(21) Appl. No.: 11/773,526

(22) Filed: Jul. 5, 2007

(65) Prior Publication Data

US 2009/0010405 A1    Jan. 8, 2009

(51) Int. Cl.
*H04M 1/2745* (2006.01)
*H04M 3/42* (2006.01)

(52) U.S. Cl.
CPC .. *H04M 1/274558* (2013.01); *H04M 1/274583* (2013.01); *H04M 3/42093* (2013.01); *H04M 3/42365* (2013.01); *H04M 3/42374* (2013.01)

(58) Field of Classification Search
CPC ............. H04M 1/274558; H04M 1/274583; H04M 3/42374; H04M 3/42093; H04M 3/42365

USPC ............. 455/229, 566, 158.4, 564, 565, 418, 455/550.1, 414.1; 379/93.23, 80, 201.1, 379/265.1
See application file for complete search history.

(56) References Cited

U.S. PATENT DOCUMENTS

| | | | |
|---|---|---|---|
| 6,442,270 B1 * | 8/2002 | Simon et al. | 379/355.09 |
| 6,961,590 B1 | 11/2005 | Toebes | |
| 2004/0018857 A1 * | 1/2004 | Asokan et al. | 455/564 |
| 2005/0091314 A1 * | 4/2005 | Blagsvedt et al. | 709/204 |
| 2007/0055742 A1 * | 3/2007 | Hebert et al. | 709/217 |
| 2010/0228560 A1 * | 9/2010 | Balasaygun et al. | 705/1.1 |

* cited by examiner

*Primary Examiner* — Marcos Torres
(74) *Attorney, Agent, or Firm* — P. Su

(57) ABSTRACT

Methods and apparatus for using a presence status to generate a list of possible contacts based on a partial entry of a contact address are disclosed. According to one aspect of the present invention, a method includes obtaining at least a partial entry of a destination address that identifies a first destination to be accessed. The method also includes identifying a plurality of potential destinations that each includes the partial entry, and determining a presence status of each potential destination. Finally, the method also includes ordering the potential destinations based on the presence status of each potential destination.

25 Claims, 5 Drawing Sheets

PRESENCE BASED CONNECTING NUMBER SEARCH

BACKGROUND OF THE INVENTION

The present invention relates generally to automatically completing telephone numbers that are dialed on a telephone or similar device.

When a partial telephone number, or a numerical sequence associated with a telephone number, is dialed, the complete telephone number may be automatically completed or otherwise identified based on the partial telephone number. Typically, a telephone may compare the partial telephone number with information stored by the telephone, e.g., previously dialed telephone numbers and/or pre-programmed telephone numbers. The telephone may identify telephone numbers that include the portion, and effectively make those telephone numbers available for use in automatically completing a dialing process. U.S. Pat. No. 6,961,590, which is incorporated herein by reference in its entirety, describes methods for automatically completing a telephone number when a partial telephone number is dialed. The methods for automatically completing a telephone number generally include generating a list of potential telephone numbers that may be ordered based upon the frequency with which each of the potential telephone numbers is dialed, and the recency associated with the last time each of the potential telephone numbers was dialed.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes obtaining at least a partial entry of a destination address that identifies a first destination to be accessed, such as a telephone number to be dialed. The method also includes identifying a plurality of potential destinations that each includes the partial entry, and determining a presence status of each potential destination. Finally, the method also includes ordering the potential destinations based on the presence status of each potential destination.

Description

Accounting for the presence of a contact or destination, e.g., the presence of an entity associated with a contact telephone number, while providing dialing autocompletion functionality enables the efficiency with which a user may dial a telephone number to be increased. An individual who is known to be on vacation or otherwise unavailable to accept a telephone call may generally be less likely to be the individual who is being contacted than another individual who is known to be at his/her office. Hence, prioritizing contacts based on their current presence status such that contacts which are present, e.g., likely available to receive and to participate in a telephone call, are presented before contacts that are not present increases the efficiency with which a dialer or caller may select an appropriate contact to utilize with autocompletion functionality.

Figure 1:
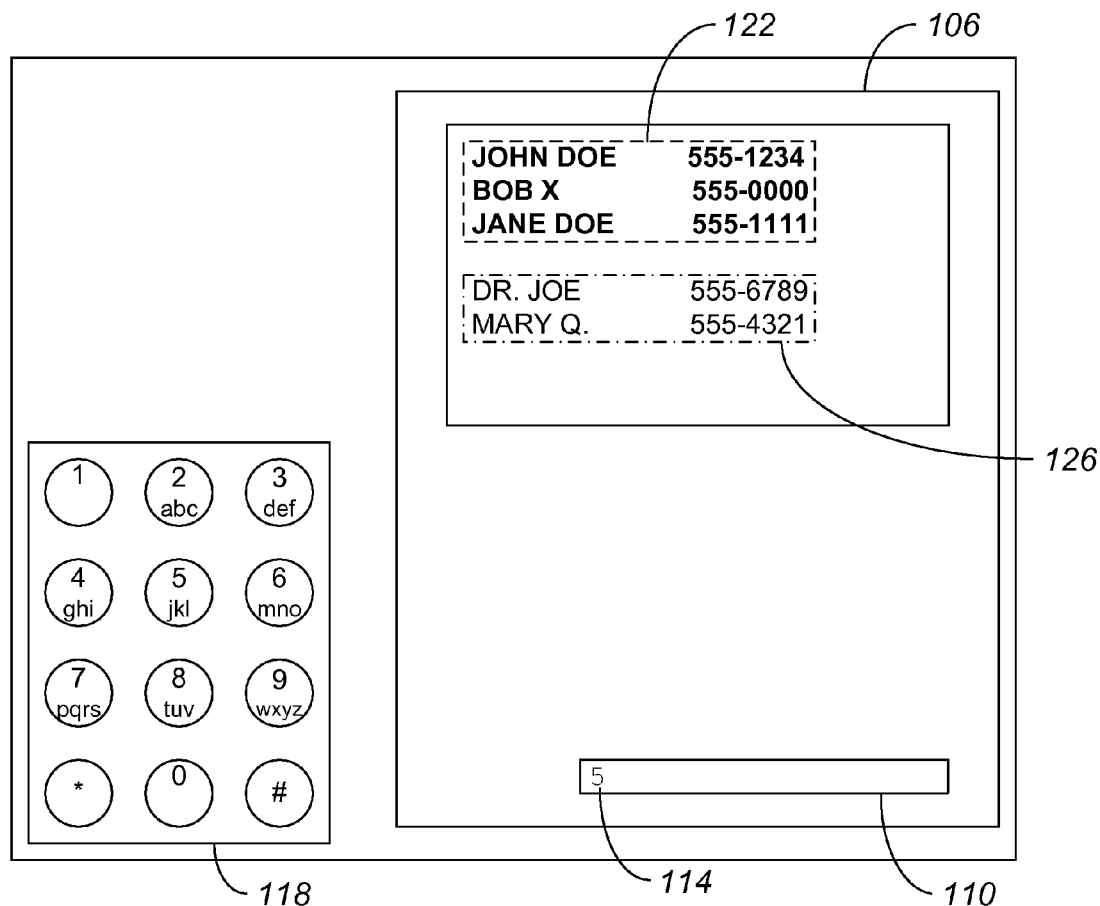
FIG. 1 is a diagrammatic representation of a system which groups and displays potential contacts based at least in part on a presence status of the potential contacts in accordance with an embodiment of the present invention.

Autocompletion functionality, or functionality which facilitates the automatic completion of a dialing process given a partially entered telephone number, may generally be implemented on a telephone system, e.g., a cellular telephone or an internet protocol (IP) networked telephone. Autocompletion functionality allows a telephone number that is effectively stored within a system to be accessed when a partial entry of a telephone number is obtained by the system, and the partial entry matches at least a portion of the stored telephone number. FIG. 1 is a diagrammatic representation of a system which includes autocompletion functionality, and is also arranged to group and to display potential contacts based at least in part on a presence status of the potential contacts, in accordance with an embodiment of the present invention. A system 102 is generally an apparatus with a display 106 and a keypad 118. In one embodiment, system 102 may be a networked telephone.

Display 106 includes a field 110 in which inputs entered using keypad 118 are displayed. As shown, an input 114, which corresponds to a partial entry of a telephone number, is displayed in field 110. Display 106 also displays potential contacts, e.g., telephone numbers, which may be matches to input 114. As shown, a group 122 displays potential contacts which are present and a group 126 displays potential contacts which are not currently present. Within each group 122, 126, the actual order in which the potential contacts are listed may be based on substantially any suitable factor. By way of example, potential contacts within each group 122, 126 may be listed in numerical order, or in an order based on a frequency of contact and/or a recency of contact associated with the potential contacts.

Although the presence status associated with group 122 may be indicated in a variety of different manners, potential contacts or destinations associated with group 122 are effectively highlighted in the described embodiment. In general, however, the presence status associated with group 122 may be indicated by substantially any method. For example, the presence status associated with group 122 may be identified by a label, e.g., either words or an icon which indicates a presence status. If the overall telephone number associated with input 114 is to be autocompleted and, hence, substantially automatically dialed, a user may make a selection from either group 122 or group 126 to facilitate an overall dialing process. Alternatively, if there is substantially only a single potential contact which is a match to input 114, the potential contact may effectively be automatically selected and dialed if the user elects to autocomplete the dialing process. It should be appreciated that a visual representation is not limited to including two separate groups. Instead, a visual representation or organization may include multiple groups based on a presence status or even a single group in which items are ordered.

Autocompletion functionality of a system such as system 102 is arranged to identify potential contacts, given an input that is a portion of a numerical string such as a telephone number. A list of potential contacts, grouped in terms of whether the potential contacts are present or not present, is generated and may be updated as the length of the inputted portion of the numerical string increases, i. e., as additional digits of a desired telephone number are provided. In other words, the list of potential contacts is essentially pruned as more of the actual desired telephone number to be dialed becomes available.

Figure 2A:
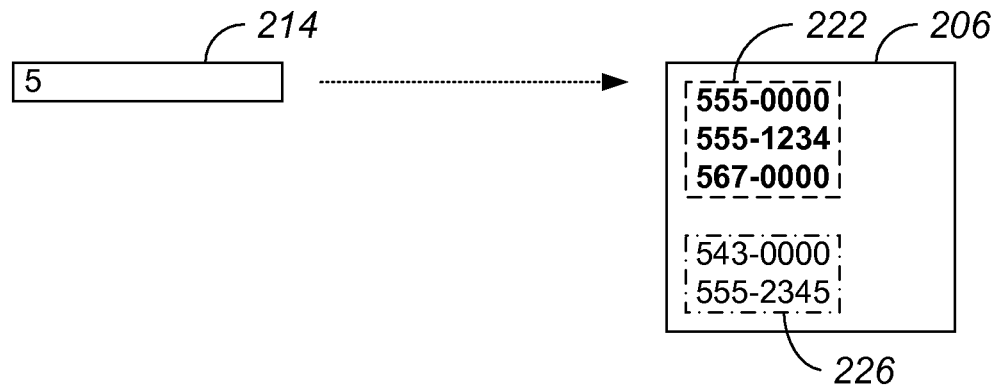
FIG. 2A is a block diagram representation of a presence based connecting number search which displays potential contacts based on a presence status of the contacts after a first number in a numerical sequence, e.g., a telephone number, is entered in accordance with an embodiment of the present invention.
Figure 2B:
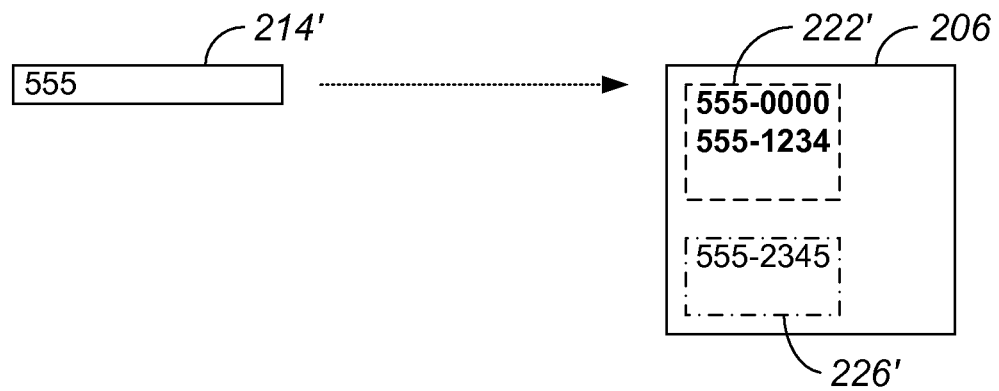
FIG. 2B is a block diagram representation of a presence based connecting number search which narrows a list of potential contacts displayed based on a presence status of the contacts after additional numbers in a numerical sequence are entered in accordance with an embodiment of the present invention.
Figure 2C:
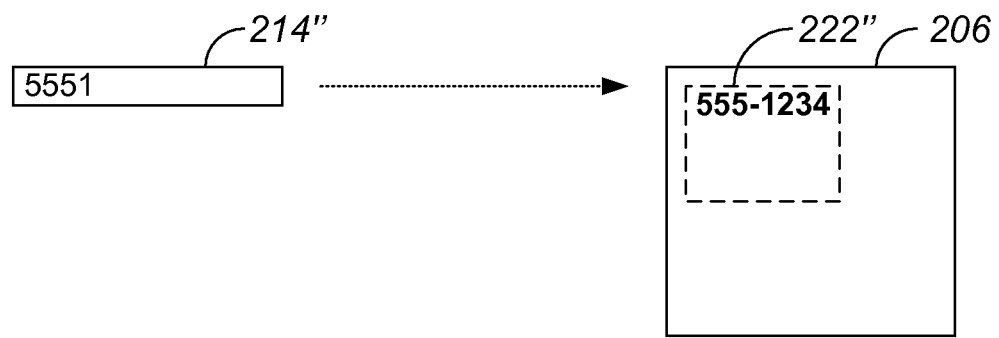
FIG. 2C is a block diagram representation of a presence based connecting number search which narrows a list of potential contacts displayed based on a presence status of the contacts to a single potential contact in accordance with an embodiment of the present invention.

Referring next to FIGS. 2A-C, the display of potential contracts based on a presence status will be described in accordance with an embodiment of the present invention. FIG. 2A is a block diagram representation of a presence based connecting number search which displays potential contacts based on a presence status of the contacts after a first number in a numerical sequence, e.g., a telephone number, is entered in accordance with an embodiment of the present invention. When an input 214 that includes a first number is provided to a system which supports presence based connecting number searches, a display 206 of contacts or destinations which are potential matches to input 214 may be provided. Display 206 includes a group 222 of potential contacts that are present or otherwise likely available to accept a call or communication, and a group 226 of potential contacts that are not present or otherwise unlikely to accept a call or communication. Groups 222, 226 are identified based on a presence based connecting number search that is based on input 214.

The number of potential contacts listed in groups 222, 226 may be reduced or narrowed if additional numbers are provided in input 214. As shown in FIG. 2B, if input 214' includes multiple numbers, a group 222' that lists contacts that are present and a group 226' that includes contacts which are not present may include fewer numbers than those associated with group 222 and group 226 of FIG. 2A. By way of example, as input 214' includes a numerical string '555,' group 222' and group 226' are effectively limited to including those contacts which begin with numerical string '555.' Contacts in groups 222', 226' effectively include numerical string '555' and numbers that connect to numerical string '555.'

In the described embodiment, as shown in FIG. 2C, when an input 214" further includes a '1' appended onto a numerical string '555' to form a numerical string '5551,' a group 222" which includes potential contacts that are present is reduced to a single potential contact, while there are no potential contacts which are not present. That is, only a single potential contact is a match to input 214", i.e., only a single potential contact includes numerical string '5551' and connecting numbers. Hence, an autocompletion may occur substantially only if the telephone number associated with input 214" is the potential contact listed in group 222". If the potential contact listed in group 222" is not the actual intended telephone number of which input 214" is a portion, then a dialing process that includes autocompletion may not be used to dial the actual intended telephone number.

Figure 3:
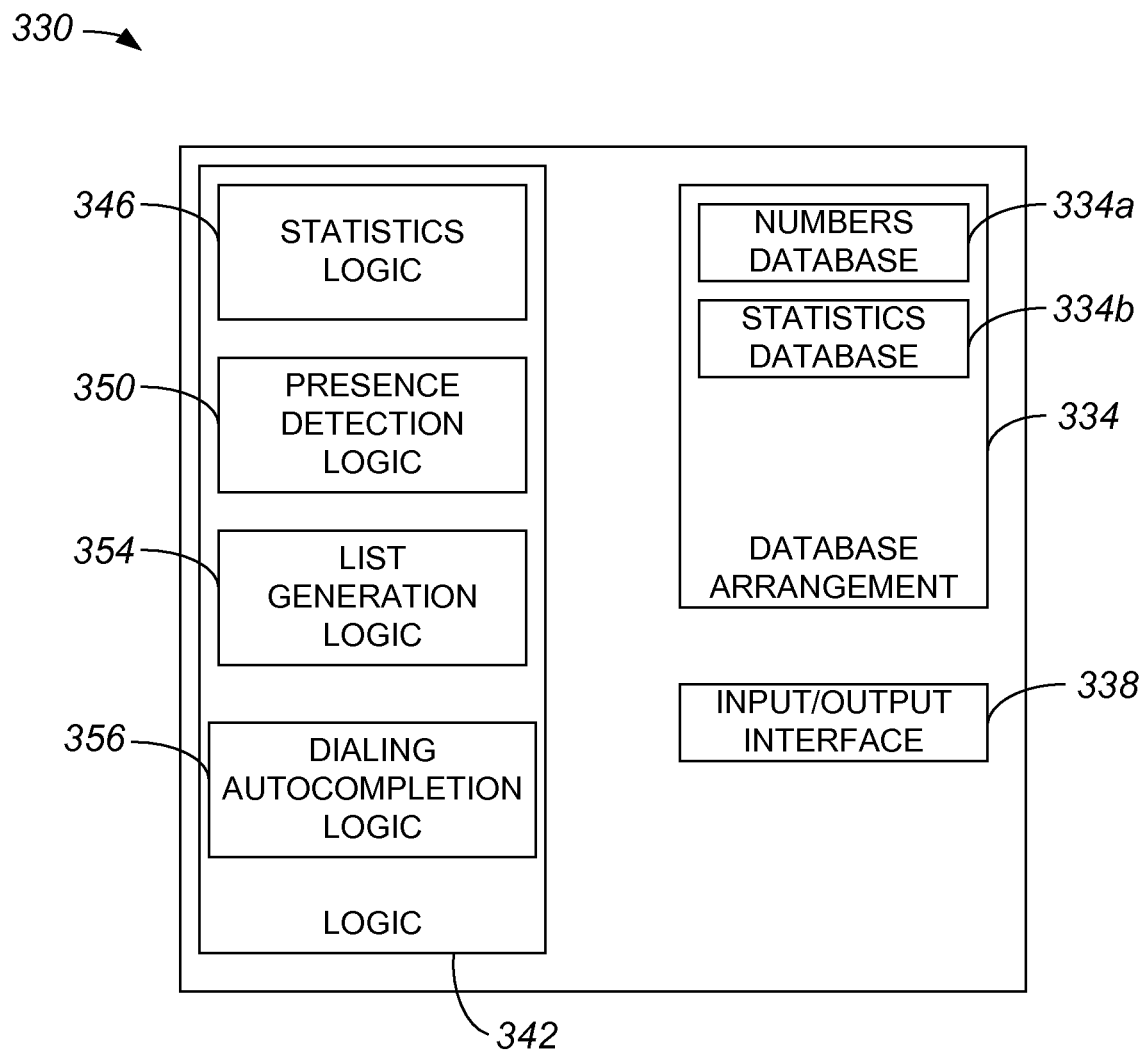
FIG. 3 is a block diagram representation of a device which is suitable for implementing a presence based connecting number search in accordance with an embodiment of the present invention.

FIG. 3 is a block diagram representation of a device which is suitable for implementing a presence based connecting number search in accordance with an embodiment of the present invention. A device 330 which implements a presence based connecting number search may be a cellular telephone, a mobile telephone, an IP network phone, an access point, or a computing system. Device 330 includes an input/output interface 338 that allows device 330 to communicate on a network, e.g., a cellular telephone network or an IP network. In one embodiment, input/output interface 338 may be a transceiver that is arranged to receive an input telephone number and to transmit a list of potential contacts on a network. Input/output interface 338, however, may also include a device such as a keyboard that may be used to obtain at least a partial entry of a destination to dial or to access, as well as a display that is arranged to display a list of potential contacts.

In general, device 330 includes a database arrangement 334, i.e., a data or information storage arrangement, and logic 342 embodied in a tangible medium and arranged to be executed. Database arrangement 334 stores or otherwise maintains information that is used by logic 342 to generate a list of potential contacts. Database arrangement 334 may includes a numbers database 334a and a statistics database 334b. Numbers database 334 may store contacts or telephone numbers that include both previously dialed telephone numbers and telephone numbers that were effectively programmed into the numbers database 334. Statistics database 334b may store statistics including, but not limited to, the frequency with which contacts stored in numbers database 334a were dialed, the recency associated with when the contacts stored in numbers database 334a were dialed, the total number of times the contacts stored in numbers database 334a were dialed, and the presence status associated with the contacts stored in numbers database 334a.

Logic 342 may include hardware and/or software logic, i.e., hardware code devices and/or software code devices. Statistics logic 346 included in logic 342 is arranged to generate statistics relating to contacts such as those statistics stored in statistics database 334b. Presence detection logic 350 is arranged to determine the presence status of contacts. In one embodiment, presence detection logic 350 may be in communication with an external application (not shown) which is arranged to ascertain the presence of contacts, e.g., the presence of individuals associated with contact telephone numbers. List generation logic 354 is arranged to create a list of potential contacts given at least the partial entry of a telephone number. In other words, list generation logic 354 obtains at least the partial entry of a telephone number, compares the partial entry to contacts stored in numbers database 334a, identifies potential contacts, and prioritizes the potential contacts in a list. List generation logic 354 is also arranged to group the potential contacts based on the presence status of the potential contacts. Logic 342 may also include dialing autocompletion logic 356 that is arranged to substantially automatically complete a dialing process based on a potential contact selected from a list of potential contacts.

Figure 4:
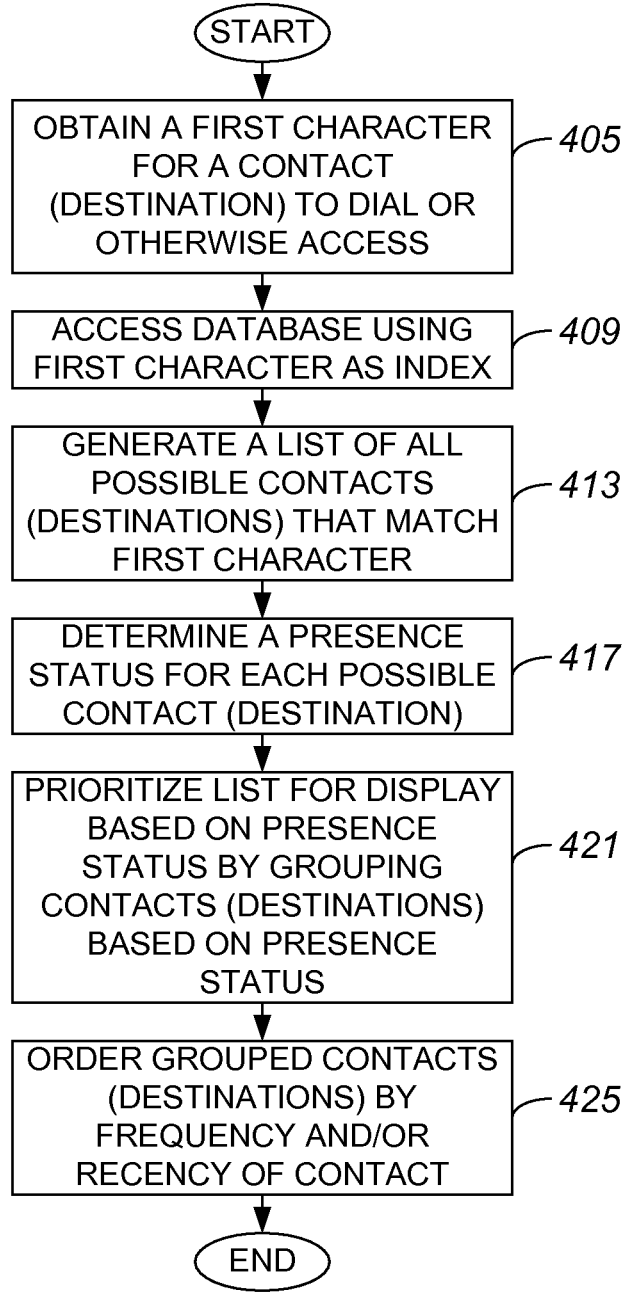
FIG. 4 is a process flow diagram which illustrates a method of enabling a presence based connecting number search in accordance with an embodiment of the present invention.

With reference to FIG. 4, one method of creating a list of potential contacts will be described in accordance with an embodiment of the present invention. A process 401 of creating a list of potential contacts begins at step 405 in which a receiver, e.g., a system such as system 330 of FIG. 3, obtains a first character from a dialer for a destination or contact to dial or otherwise access. After obtaining the first character, the receiver accesses a database using the first character as an index in step 409. That is, the receiver uses the first character to identify contacts stored in a database that begin with or otherwise contain the first character. It should be understood that identifying contacts may essentially involve identifying telephone numbers or communication addresses for individuals or organizations that serve as contacts identified within the system.

From step 409, process flow moves to step 413 in which a list of substantially all possible contacts that match the first character is generated. By way of example, if contacts are telephone numbers or pager numbers, and the first character is a '5,' then the list of substantially all possible contacts that is generated may include substantially all telephone numbers or pager numbers that begin with a '5' and have numbers that connect off of the '5.' In step 417, a presence status for each contact in the list is determined. Determining the presence status for each contact may include, but is not limited to, determining whether a contact is currently associated with a do-not-disturb status or a vacation status. The methods used to determine a presence status may generally vary widely.

The presence status may generally be expressed as either a status of being "present" or a status of being "not present." In one embodiment, the presence status may additionally include a status of being "unknown," as for example if the receiver does not have any information relating to the presence status associated with a particular telephone number. Once the presence status for each possible contact is determined, the list of potential contacts is prioritized in step 421 based on the presence status of each possible contact. Typically, the potential contacts associated with the list may be prioritized such that the potential contacts that are present are grouped together, and the potential contacts that are not present are grouped together. The potential contacts that are present may be displayed such that they are effectively prioritized over the potential contacts that are not present.

After the contacts are grouped based on the presence status of the contacts, each group of contacts may be ordered in step 425, e.g., such that the contacts may be presented on a display screen for selection by a dialer. The contacts may be ordered based on an ordering function, as will be described below with respect to FIGS. 5A and 5B. An ordering function may, in one embodiment, take into account the frequency with which each contact in a group has been dialed or otherwise accessed and/or the recency with which each contact in a group has been dialed or otherwise accessed. In other words, the presence status of each contact may effectively be combined with information relating to the frequency and/or recency of access to order a list of potential contacts based on the first number provided as an input in step 405. Upon ordering the contacts that have been grouped based on their presence status, the process of creating a list of potential contacts is completed.

It should be appreciated that the steps of FIG. 4 may generally be repeated for each character of a numerical sequence that is obtained by the receiver. In other words, the steps associated with performing a presence based connecting search may be repeated until either all numbers associated with a contact have been obtained, or a single potential contact has been identified.

Figure 5A:
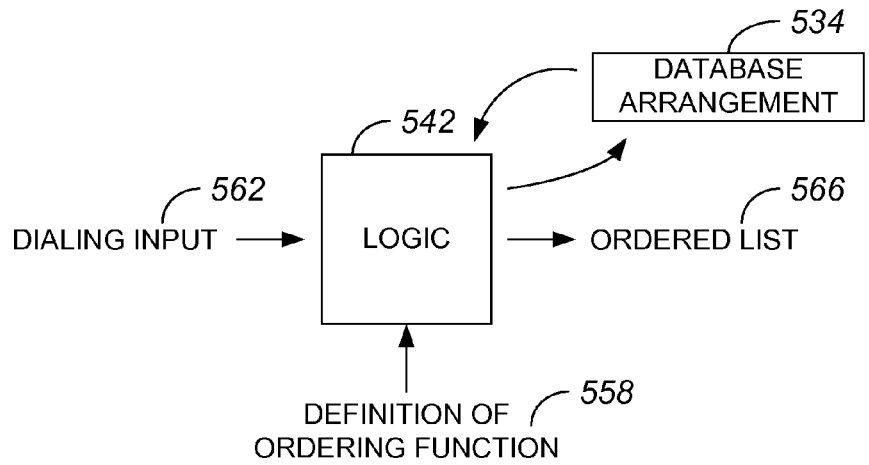
FIG. 5A is a block diagram representation of the generation of an ordered list of contacts or destinations in accordance with an embodiment of the present invention.

As mentioned above, a system which allows a presence based connecting number search, or a search for potential contacts based on at least a partial entry of a destination to dial or otherwise access, may define an ordering function that is to be used to prioritize potential contacts included in a list of potential contacts that is grouped based on the presence status of the potential contacts. FIG. 5A is a block diagram representation of the generation of an ordered list of contacts or destinations in accordance with an embodiment of the present invention. Logic 542 is arranged to receive a dialing input 562, or a destination to dial or otherwise access. Upon receiving the dialing input 562, logic 542 accesses a database arrangement 534 to identify potential contacts that effectively match dialing input 562. Logic 542 also accesses database arrangement 534 to obtain information that may be used by an ordering function 558 to create an ordered list 566 of potential contacts.

Ordering function 558 may be defined to effectively assign an ordering number to each potential contact or destination that is to be included in ordered list 566. The assigned ordering number may be used, in one embodiment, to order potential contacts in ordered list 566. For example, after potential contacts are divided into groups based on the presence status of the potential contacts, the potential contacts within each group may be ordered based on their ordering numbers.

Figure 5B:
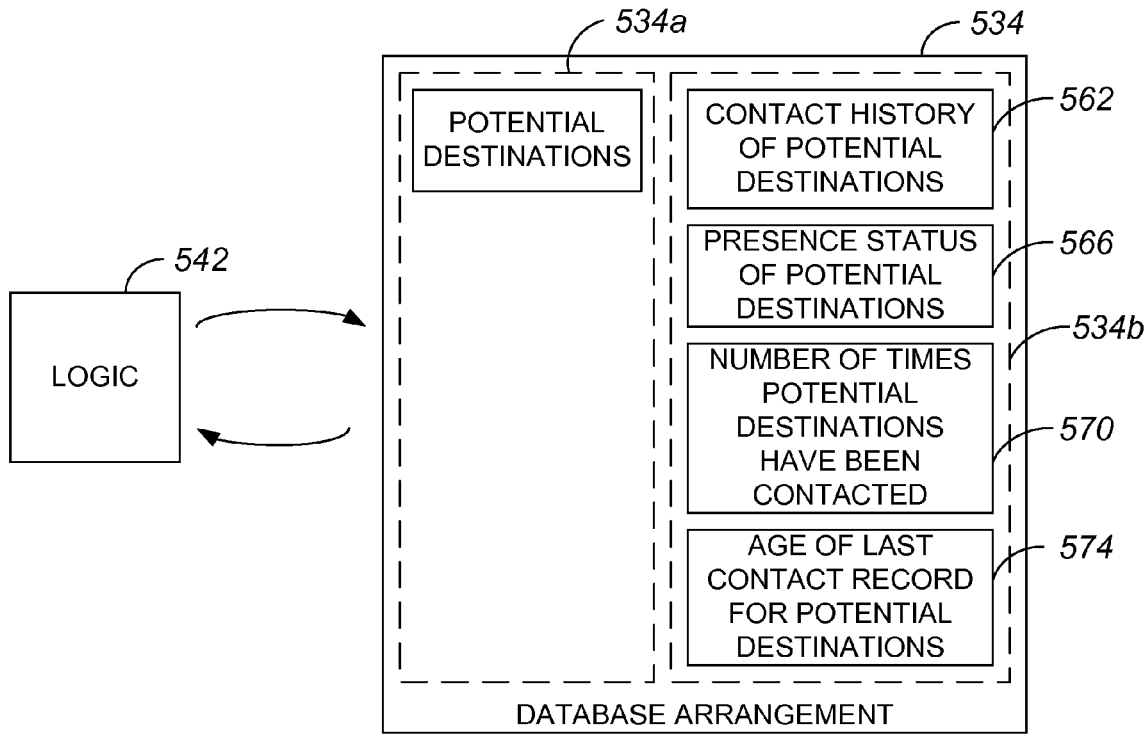
FIG. 5B is a block diagram representation of the contents of a database, e.g., database 534 of FIG. 5A, which are used in an ordering function to determine an order in which to list potential contacts or destinations in accordance with an embodiment of the present invention.

As previously mentioned, logic 542 typically accesses database arrangement 534 to obtain information that may be used by ordering function 558. FIG. 5B is a representation of the information in database arrangement 534 that may be used by logic 542 to implement ordering function 558 in accordance with an embodiment of the present invention. Database arrangement 534 includes a numbers database 534*a* and a statistics database 534*b*. Potential contacts or destinations are stored within numbers database 534*a*. Statistics database 534*b* is arranged to store a contact history of potential contacts or destinations 562, the presence status of the potential contacts 566, the number of times each potential destination has been contacted or otherwise accessed 570, and the age of the last contact record for each potential contact 574.

The information stored in statistics database 534*b* may be assigned different weights depending upon the definition associated with ordering function 558 of FIG. 5A. Further, the presence status of potential contacts 566 may be indicated by values such that an available status is assigned a relatively high value, while an unavailable status such as a vacation status is assigned a relatively low value. Additionally, if a potential contact has a last contact record age 574 that is relatively low and is contacted relatively often, that potential contact may have a high ordering value.

Although only a few embodiments of the present invention have been described, it should be understood that the present invention may be embodied in many other specific forms without departing from the spirit or the scope of the present invention. By way of example, an ordering function that may be used to characterize a potential contact has generally been described as including a representation of a contact history, the presence status of the contact, the total number of times the contact has been contacted, and the age of the most recent contact record. The ordering function, however, may include any number of factors. Further, the factors included in the ordering function may vary widely.

Groups of potential contacts that may be used with auto-complete functionality have been described as being formed based on the presence status of the potential contacts. In one embodiment, the presence status of potential contacts may be used as one aspect of an ordering function such that although the presence status is considered in prioritizing the potential contacts for listing, groups specifically based on the presence status are not formed. That is, presence status may be considered when prioritizing the way potential contacts are ordered in a listing, even if the potential contacts are not specifically grouped into a group of potential contacts that are present and a group of potential contacts that are not present.

While a presence status of contacts is typically factored into the generation of a list of potential contacts, in some instances, the presence status may effectively be ignored. For instance, if a contact or access history of a particular potential contact indicates that the particular potential contact has been contacted significantly more than any other potential contact, the presence status of the potential contacts may be disregarded. Alternatively, if statistics indicate that a particular potential contact has been dialed even when the presence status of the potential contact indicates a do-not-disturb or vacation status, the presence status of the potential contact may be disregarded.

The present invention has generally been described as being suitable for use in ordering contacts such as telephone numbers based on a presence status. Contacts that may be ordered based on a presence status are not limited to telephone numbers. Contacts may include destination addresses other than telephone numbers. By way of example, contacts may also include, but are not limited to including, e-mail addresses and user identifiers that are suitable for use in instant messaging applications. For instance, autocompletion functionality associated with an e-mail application may list e-mail addresses that potentially match a partial e-mail address based on the presence status associated with the e-mail addresses. It should be understood that the present invention is not limited to telephone numbers and e-mail addresses, but may generally cover any person, object, or device that has an associated presence status. Such objects or devices may include substantially any mobile device, monitoring device, or sensor which utilize presence indicators.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
   obtaining at least a partial entry, the partial entry being associated with a destination address, the destination address being arranged to identify a first destination to be accessed;
   identifying a plurality of potential destinations, wherein each potential destination of the plurality of potential destinations includes the partial entry, the plurality of potential destinations including the first destination, the plurality of potential destinations including previously accessed destinations and destinations programmed into a database;
   determining a presence status of each potential destination of the plurality of potential destinations, wherein determining the presence status of each potential destination of the plurality of potential destinations includes determining whether the presence status of each potential destination indicates presence, determining whether the presence status of each potential destination indicates a lack of presence, and determining whether the presence status of each potential destination is unknown;
   ordering the plurality of potential destinations, wherein ordering the plurality of potential destinations includes using the presence status of at least some of the potential destinations, wherein ordering the plurality of potential destinations includes determining whether to use the presence status of a second potential destination of the plurality of potential destinations when ordering the plurality of potential destinations;
   determining if the first destination has been selected from the plurality of potential destinations; and
   automatically completing the destination address if it is determined that the first destination has been selected, wherein automatically completing the destination address includes automatically adding on to the partial entry to cause the first destination to be accessed.

2. The method of claim 1 wherein ordering the plurality of potential destinations includes grouping the plurality of potential destinations into a first group and a second group, the first group being arranged to include potential destinations which have a status indicating presence, the second group being arranged to include potential destinations which have a status indicating lack of presence.

3. The method of claim 1 wherein ordering the plurality of potential destinations includes applying an ordering function to each potential destination of the plurality of potential destinations to determine an ordering value for each potential destination of the plurality of potential destinations.

4. The method of claim 3 wherein applying the ordering function to each potential destination of the plurality of potential destinations includes obtaining frequency and recency information associated with each potential destination.

5. The method of claim 4 wherein applying the ordering function to each potential destination of the plurality of potential destinations further includes determining the ordering value for each potential destination using the frequency and recency information.

6. The method of claim 5 wherein determining whether to use the presence status of the second potential destination includes determining when the frequency information indicates that the second potential destination has been accessed more than any other potential destination of the plurality of potential destinations, and wherein the method further includes:
   not using the presence status of the second potential destination when ordering the plurality of potential destinations when it is determined that the frequency information indicates that the second potential destination has been accessed more than any other potential destination, wherein not using the presence status of the second potential destination includes assigning the second potential destination a highest ordering value.

7. The method of claim 1 wherein ordering the plurality of potential destinations based on the presence status of each potential destination includes creating a list of the plurality of potential destinations ordered based on the presence status, and the method further includes:
   displaying the list.

8. The method of claim 7 wherein the presence status is arranged to indicate a likelihood of accepting communications, and wherein displaying the list includes grouping the plurality of potential destinations into a first group that is likely to accept the communications and a second group that is unlikely to accept the communications, the first group being ordered based on the frequency and recency information, the second group being ordered based on the frequency and recency information.

9. The method of claim 7 further including:
obtaining an additional entry, the additional entry being associated with the destination address and arranged to be appended to the partial entry;
narrowing the plurality of potential destinations, wherein narrowing the plurality of potential destinations includes removing any potential destination from the plurality of destinations that does not include the additional entry from the list.

10. Logic encoded in one or more non-transitory tangible media for execution and when executed operable to:
obtain at least a partial entry, the partial entry being associated with a destination address, the destination address being arranged to identify a first destination to be accessed;
identify a plurality of potential destinations, wherein each potential destination of the plurality of potential destinations includes the partial entry, the plurality of potential destinations including the first destination, the plurality of potential destinations including previously accessed destinations and destinations programmed into a database;
determine a presence status of each potential destination of the plurality of potential destinations, wherein the logic operable to determine the presence status of each potential destination of the plurality of potential destinations is operable to determine whether the presence status of each potential destination indicates presence, determine whether the presence status of each potential destination indicates a lack of presence, and determine whether the presence status of each potential destination is unknown;
order the plurality of potential destinations, wherein the logic operable to order the plurality of potential destinations includes logic operable to use the presence status of at least some of the potential destinations, wherein the logic operable to order the plurality of potential destinations is operable to determine whether to use the presence status of a second potential destination of the plurality of potential destinations when ordering the plurality of potential destinations;
determine if the first destination has been selected from the plurality of potential destinations; and
automatically complete the destination address if it is determined that the first destination has been selected, wherein the logic operable to automatically complete the destination address is operable to automatically add on to the partial entry to cause the first destination to be accessed.

11. The logic of claim 10 wherein the logic operable to order the plurality of potential destinations includes logic operable to group the plurality of potential destinations into a first group and a second group, the first group being arranged to include potential destinations which have a status indicating presence, the second group being arranged to include potential destinations which have a status indicating lack of presence.

12. The logic of claim 10 wherein the logic operable to order the plurality of potential destinations includes logic operable to apply an ordering function to each potential destination of the plurality of potential destinations to determine an ordering value for each potential destination of the plurality of potential destinations.

13. The logic of claim 12 wherein the logic operable to apply the ordering function to each potential destination of the plurality of potential destinations includes logic operable to obtain frequency and recency information associated with each potential destination.

14. The logic of claim 13 wherein the logic operable to apply the ordering function to each potential destination of the plurality of potential destinations further includes logic operable to determine the ordering value for each potential destination using the frequency and recency information, wherein the logic operable to determine the ordering value using the frequency and recency information includes logic operable to ignore the presence status of the second potential destination when the frequency and recency information indicates that the second potential destination is the most often contacted destination of the plurality of potential destinations.

15. The logic of claim 10 wherein the logic operable to order the plurality of potential destinations based on the presence status of each potential destination includes logic operable to create a list of the plurality of potential destinations ordered based on the presence status, and the logic is further operable to display the list.

16. The logic of claim 15 further operable to:
obtain an additional entry, the additional entry being associated with the destination address and arranged to be appended to the partial entry;
narrow the plurality of potential destinations, wherein the logic operable to narrow the plurality of potential destinations includes logic operable to remove any potential destination from the plurality of destinations that does not include the additional entry from the list.

17. An apparatus comprising:
means for obtaining at least a partial entry, the partial entry being associated with a destination address, the destination address being arranged to identify a first destination to be accessed;
means for identifying a plurality of potential destinations, wherein each potential destination of the plurality of potential destinations includes the partial entry, the plurality of potential destinations including the first destination, the plurality of potential destinations including previously accessed destinations and destinations programmed into a database;
means for determining a presence status of each potential destination of the plurality of potential destinations, wherein the means for determining the presence status of each potential destination of the plurality of potential destinations include means for determining whether the presence status of each potential destination indicates presence, means for determining whether the presence status of each potential destination indicates a lack of presence, and means for determining whether the presence status of each potential destination is unknown;
means for ordering the plurality of potential destinations, wherein the means for ordering the plurality of potential destinations includes the presence status of at least some of the potential destinations, wherein the means for ordering the plurality of potential destinations includes means for determining whether to use the presence status of a second potential destination of the plurality of potential destinations;
means for determining if the first destination has been selected from the plurality of potential destinations; and
means for automatically completing the destination address if it is determined that the first destination has been selected, wherein automatically completing the destination address includes automatically adding on to the partial entry to cause the first destination to be accessed.

18. An apparatus comprising:
an interface, the interface being arranged to obtain a partial entry associated with a contact address;
a database arrangement, the database arrangement being arranged to store information associated with a plurality of contacts, the database arrangement further being arranged to store statistics associated with the plurality of contacts, the plurality of contacts including previously accessed contacts and contacts programmed into the database arrangement;
logic arranged to determine a presence status of each contact of the plurality of contacts, wherein the logic arranged to determine the presence status of each contact of the plurality of contacts is arranged to determine whether the presence status of each potential destination indicates presence, determine whether the presence status of each potential destination indicates a lack of presence, and determine whether the presence status of each potential destination is unknown; and
logic arranged to compare the partial entry with the plurality of contacts to create a list of potential contacts that are a match to the partial entry, the potential contacts being included in the plurality of contacts, wherein the logic arranged to compare the partial entry with the plurality of contacts to create the list of potential contacts includes logic arranged to group the potential contacts according to the presence status of the potential contacts.

19. The apparatus of claim 18 wherein the contact address is a telephone number and the plurality of contacts are telephone numbers.

20. The apparatus of claim 18 wherein the potential contacts are grouped in a first group and a second group, the first group including potential contacts having a status of being present and the second group including potential contacts having a status of being not present, the apparatus further including:
logic arranged to apply an ordering function to the potential contacts to determine an order in which the potential contacts are listed in the first group and an order in which the potential contacts are listed in the second group, the ordering function being arranged to utilize at least one selected from the group including a frequency of access associated with each potential contact and a recency of access associated with each potential contact.

21. The apparatus of claim 20 wherein the database arrangement is arranged to store information including the frequency of access associated with each potential contact and the recency of access associated with each potential contact.

22. The apparatus of claim 18 further including logic arranged to use the list of potential contacts to complete a telephone dialing process.

23. The apparatus of claim 18 wherein the statistics include information relating to the frequency with which the contacts were accessed and information on the recency associated with when the contacts were accessed, and wherein the logic arranged to group the potential contacts is arranged to account for the frequency with which the contacts were accessed and the recency with which the contacts were accessed.

24. A method comprising:
obtaining at least a partial entry, the partial entry being associated with a destination address, the destination address being arranged to identify a first destination to be accessed;
identifying a plurality of potential destinations, wherein each potential destination of the plurality of potential destinations includes the partial entry, the plurality of potential destinations including the first destination;
determining a presence status of each potential destination of the plurality of potential destinations;
determining a frequency with which each potential destination of the plurality of potential destinations is accessed;
determining a recency with which each potential destination of the plurality of potential destinations is accessed;
ordering the plurality of potential destinations based on the presence status of each potential destination, the frequency with which each potential destination is accessed, and the recency with which each potential destination is accessed, wherein ordering the plurality of potential destinations includes grouping the plurality of potential destinations based on the presence status into at least a first group and a second group and, after grouping the plurality of potential destinations based on the presence status into at least the first group and the second group, ordering the plurality of potential destination in the first group based on the frequency with which each potential destination is accessed and the recency with which each potential destination is accessed;
determining if the first destination has been selected from the plurality of potential destinations; and
automatically completing the destination address if it is determined that the first destination has been selected, wherein automatically completing the destination address includes automatically adding on to the partial entry to cause the first destination to be accessed.

25. A method comprising:
obtaining at least a partial entry, the partial entry being associated with a destination address, the destination address being arranged to identify a first destination to be accessed;
identifying a plurality of potential destinations, wherein each potential destination of the plurality of potential destinations includes the partial entry, the plurality of potential destinations including the first destination, the plurality of potential destinations including previously accessed destinations and destinations programmed into a database;
identifying a second destination of the plurality of potential destinations, the second destination being the most contacted potential destination of the plurality of potential destinations;
determining a presence status of each potential destination of the plurality of potential destinations, wherein determining the presence status of each potential destination of the plurality of potential destinations includes determining whether the presence status of each potential destination indicates presence, determining whether the presence status of each potential destination indicates a lack of presence, and determining whether the presence status of each potential destination is unknown;
generating a list of the potential destinations, wherein generating the list of potential destinations includes ordering the plurality of potential destinations, wherein ordering the plurality of potential destinations includes ordering each potential destination except for the second destination based the presence status of each potential destination, wherein generating the list of potential destinations includes placing the second destination first in the list;
determining if the first destination has been selected from the plurality of potential destinations; and
automatically completing the destination address if it is determined that the first destination has been selected, wherein automatically completing the destination address includes automatically adding on to the partial entry to cause the first destination to be accessed.

\* \* \* \* \*